(12) United States Patent
Hirschhorn et al.

(10) Patent No.: US 11,796,398 B2
(45) Date of Patent: Oct. 24, 2023

(54) THERMOMETER WITH PROBE-SWITCHED LAMP

(71) Applicant: FRIDABABY, LLC, Miami, FL (US)

(72) Inventors: Chelsea Hirschhorn, Miami, FL (US); Gregary Adam Hack, Aventura, FL (US); Maria V. Level, Miami, FL (US); Samuel Sauceda, El Serino, CA (US); Matthew Saxton, Agoura Hills, CA (US); You Qifeng, Hangzhou (CN)

(73) Assignee: FRIDABABY, LLC, Miami, FL (US)

( * ) Notice: Subject to any disclaimer, the term of this patent is extended or adjusted under 35 U.S.C. 154(b) by 0 days.

(21) Appl. No.: 17/846,372

(22) Filed: Jun. 22, 2022

(65) Prior Publication Data
US 2022/0373400 A1 Nov. 24, 2022

Related U.S. Application Data

(62) Division of application No. 16/875,549, filed on May 15, 2020, now Pat. No. 11,506,547.

(51) Int. Cl.
*G01K 13/20* (2021.01)
*G01K 7/22* (2006.01)
*G01K 1/14* (2021.01)

(52) U.S. Cl.
CPC ............... *G01K 13/20* (2021.01); *G01K 1/14* (2013.01); *G01K 7/22* (2013.01)

(58) Field of Classification Search
None
See application file for complete search history.

(56) References Cited

U.S. PATENT DOCUMENTS

| | | | |
|---|---|---|---|
| 3,947,750 | A | 3/1976 | Nichols |
| 4,619,271 | A | 10/1986 | Burger et al. |
| 5,013,160 | A | 5/1991 | Massey et al. |
| 5,013,161 | A | 5/1991 | Zaragoza et al. |
| 5,018,875 | A | 5/1991 | Cook |
| 5,575,563 | A | 11/1996 | Chiu et al. |
| 6,406,182 | B1 | 6/2002 | Chen |

(Continued)

FOREIGN PATENT DOCUMENTS

| | | |
|---|---|---|
| CN | 203241173 U | 10/2013 |
| CN | 207798278 U | 8/2018 |
| DE | 3902537 A1 | 8/1990 |

OTHER PUBLICATIONS

Combined Search and Examination Report, GB Application No. 2106650.1, dated Jul. 7, 2021, 6 pages, United Kingdom Intellectual Property Office.

*Primary Examiner* — Erica S Lin
(74) *Attorney, Agent, or Firm* — PERKINS IP LAW GROUP LLC; Jefferson Perkins

(57) ABSTRACT

An electronic thermometer has at least first and second use configurations. In moving from one use configuration to another, probe arm swings about an axis that is located closer to one end of an elongate thermometer body than it is to the other end. In one of the configurations, a portion of the length of the probe arm is received within a channel in the body. One end of the body has an electric lamp that may be turned on and off by a switch. A switch button is located in the bottom of the channel. A user may press against the side of the probe arm which in turn will press against the switch button, thereby taming the lamp on or off.

5 Claims, 11 Drawing Sheets

(56) References Cited

U.S. PATENT DOCUMENTS

| | | | |
|---|---|---|---|
| 6,485,433 | B1 | 11/2002 | Peng |
| 6,957,911 | B2 | 10/2005 | Wong et al. |
| D545,223 | S | 6/2007 | Chen |
| 7,422,367 | B2 | 9/2008 | Howansky |
| 7,448,799 | B2 | 11/2008 | Juhng et al. |
| 7,520,668 | B2 | 4/2009 | Chen |
| 10,006,817 | B2 | 6/2018 | Swayne et al. |
| 2004/0264546 | A1* | 12/2004 | Wong .................... G01K 13/20 374/E13.002 |
| 2005/0226307 | A1 | 10/2005 | Lussier et al. |
| 2016/0109300 | A1 | 4/2016 | Lin et al. |
| 2017/0254706 | A1 | 9/2017 | Ganrude et al. |
| 2017/0322093 | A1* | 11/2017 | Dutterer ............. F21V 23/0414 |

\* cited by examiner

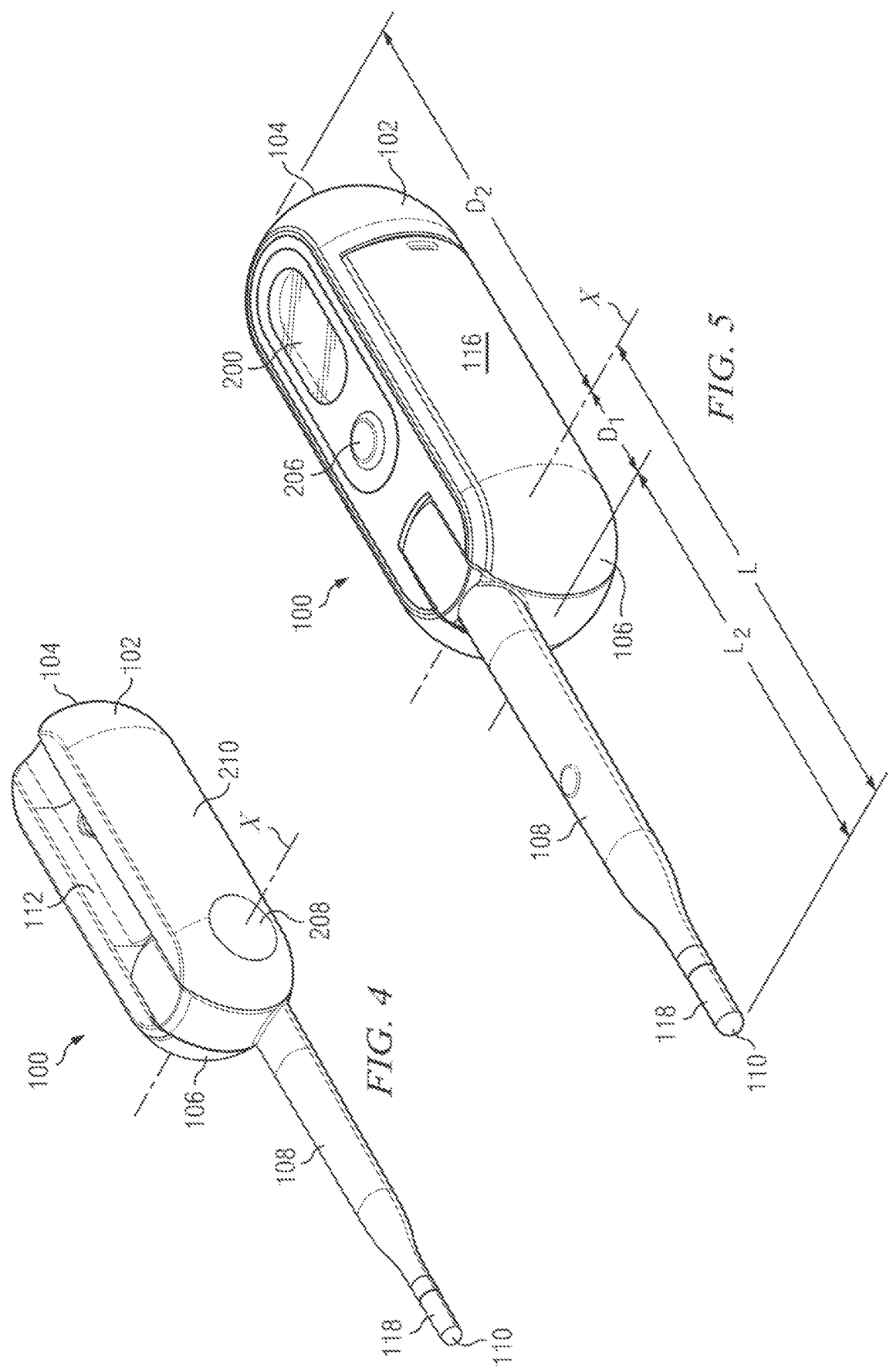

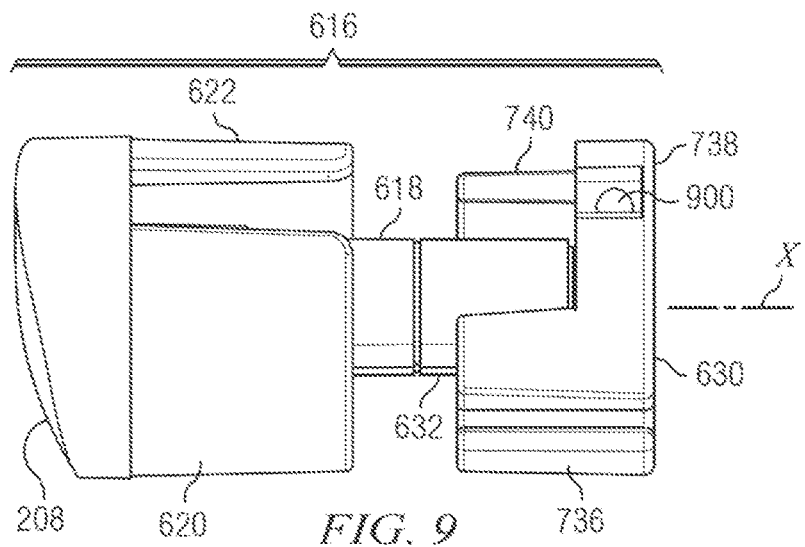
FIG. 9
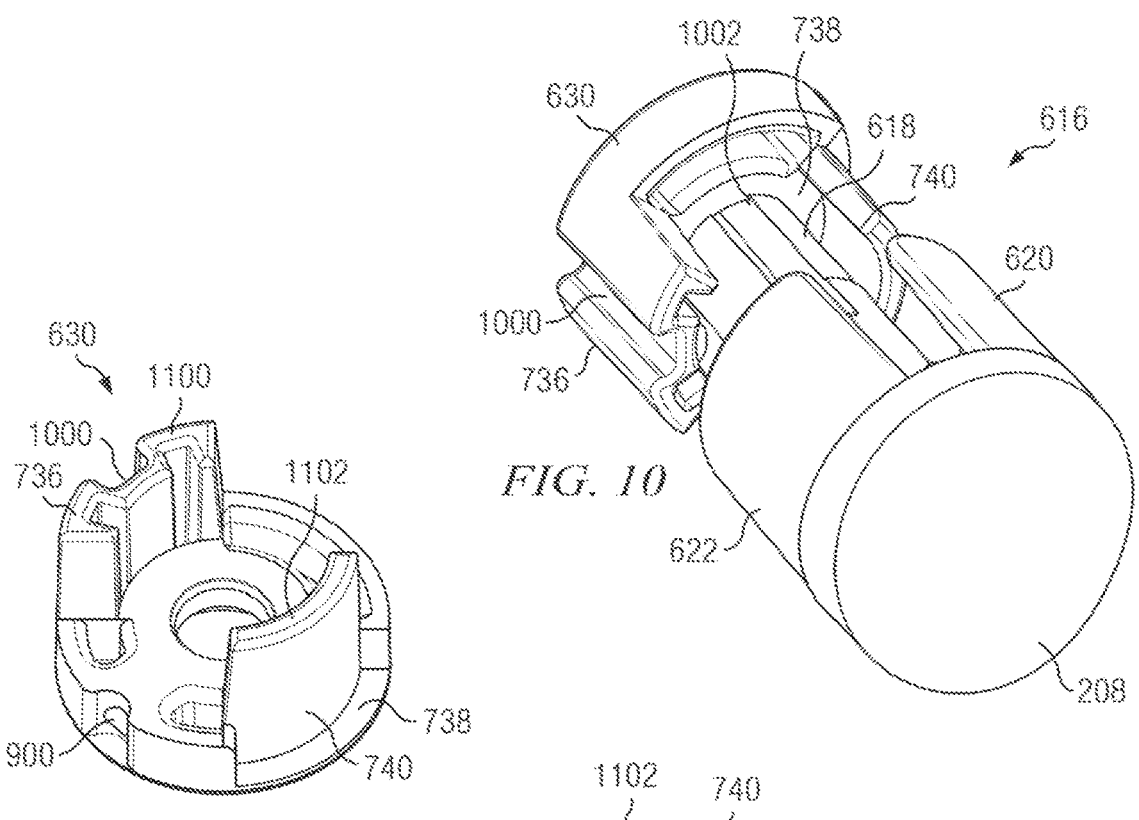
FIG. 10
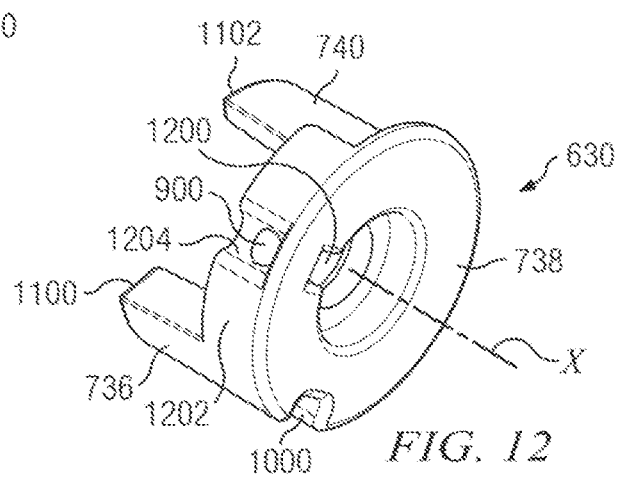
FIG. 11
FIG. 12

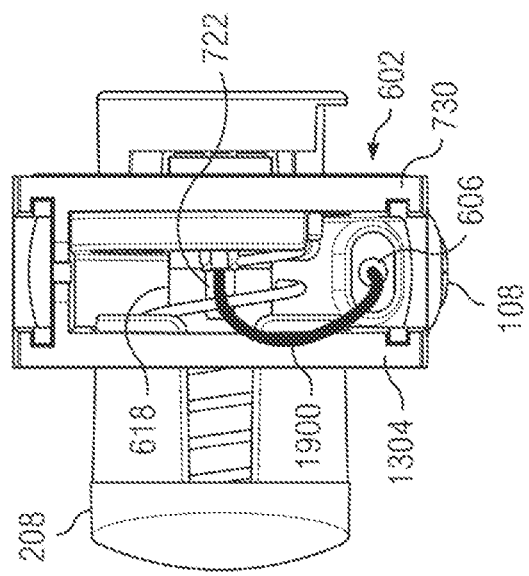
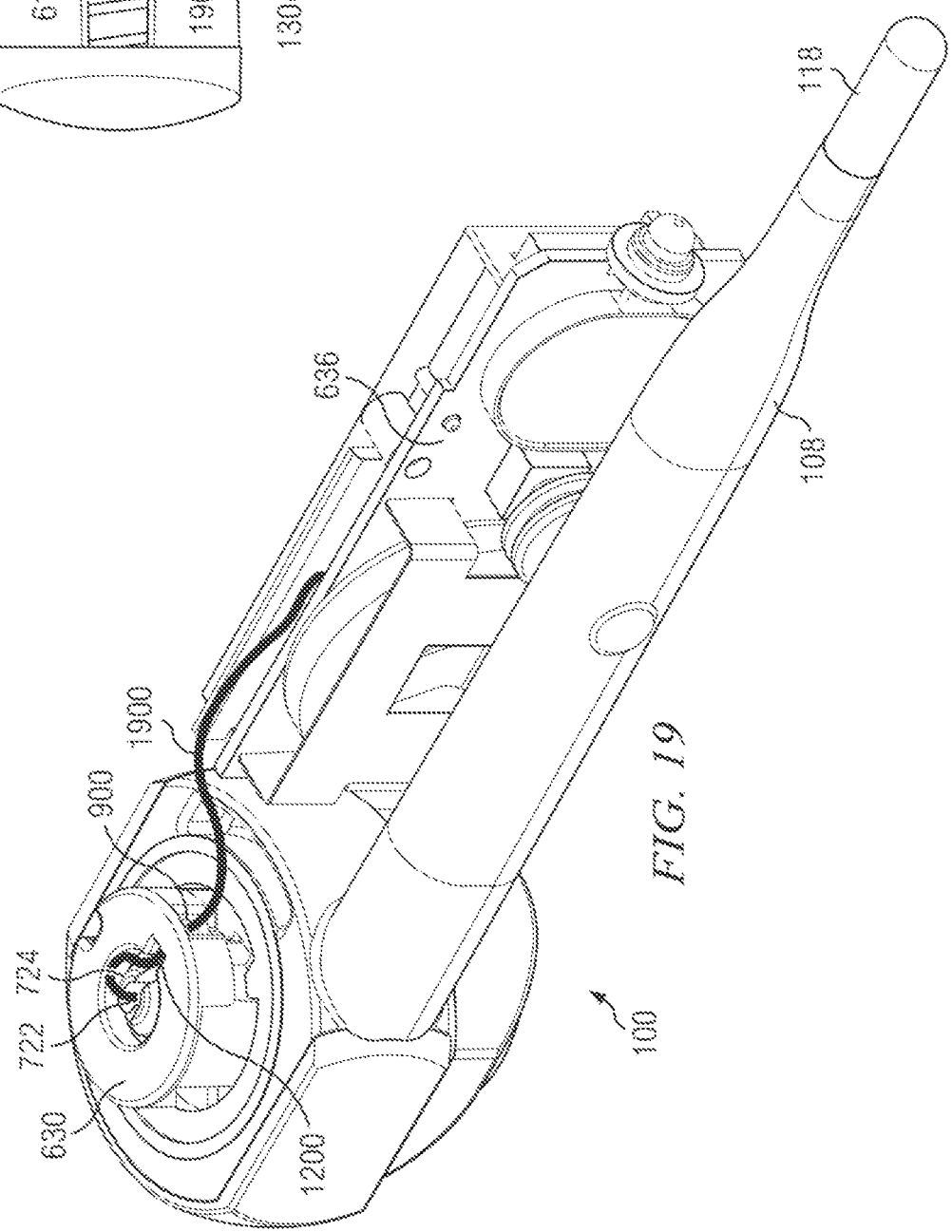

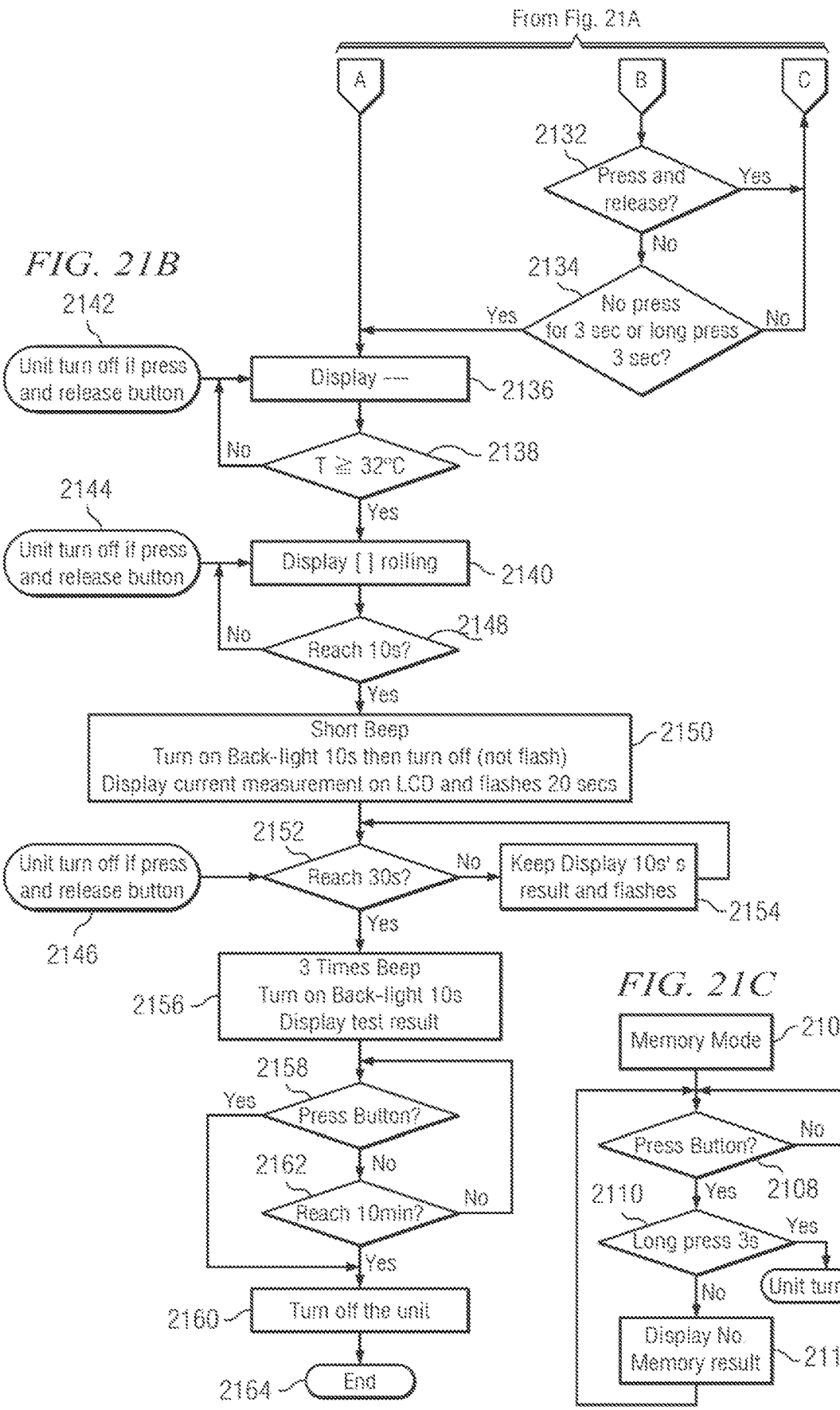

THERMOMETER WITH PROBE-SWITCHED LAMP

RELATED APPLICATION

This application is a division of pending U.S. patent application Ser. No. 16/875,549 filed May 15, 2020, owned by the Applicant hereof. The specification and drawings of the foregoing application are fully incorporated by reference herein.

BACKGROUND OF THE INVENTION

It is known to provide electronic thermometers for taking the temperature of patients and more particularly of infants. These thermometers typically have a thermistor temperature probe and a display on the body of the thermometer for reading the temperature. The body of the thermometer contains circuitry coupled to the thermistor probe for interpreting the readings from the probe, and for driving the temperature display. The thermometer body typically will also include a power source such as a battery.

It is often desirable to assess the temperature of an infant using a rectal probe. Measuring the temperature in the rectum is deemed to be the most accurate way to obtain a core temperature of a patient. On the other hand, this is not the most pleasant of experiences and, as the infant grows older, the caregiver may choose to take the infant's temperature in the infant's mouth or armpit instead. Ideally, a single electronic thermometer could be provided that is well adapted to take an infant's temperature in any of these ways.

SUMMARY OF THE INVENTION

The present invention provides such a multiple-configuration thermometer. According to one aspect of the invention, the thermometer has an elongate body with a front end and an opposed rear end. The thermometer further has an elongate probe arm, with a temperature probe mounted on its free end. The probe arm is connected to the body at a probe arm axis that is spaced from the front end of the body by a first length, and is spaced from the rear end of the body by a second length that is less than the first length. A length of the probe arm, as measured between the probe arm free end and the probe arm axis, is longer than the first length.

The probe arm is rotatable around its axis between a first use configuration and a second use configuration. In the first use configuration, in which for example the thermometer is configured for taking a rectal temperature, the temperature probe is closer to the front end of the body than it is to the rear end of the body. In the second use configuration, in which for example the thermometer is configured for taking an oral or armpit temperature, the temperature probe is closer to the rear end of the body than it is to the front end of the body. When the probe arm is in the first configuration, the temperature probe is spaced from the front end of the body by a predetermined third length. When the probe arm is in the second configuration, the temperature probe is spaced from the rear end of the body by a fourth length that is greater than the third length.

In one embodiment, a width of the body's front end, taken at right angles to the body length axis, is greater than a width of the probe arm, taken at right angles to the probe arm's length axis. This difference creates a stop so that, when the thermometer is in the first use configuration, the thermometer may be used as a rectal thermometer, and so that the rectum of the infant may not be penetrated by more than the third length of the probe arm.

In one embodiment, the probe arm locks to either of the first and second use configurations. A probe arm configuration button is mounted on the body and is mechanically coupled to the probe arm. The probe arm configuration button is movable between a first button position and a second button position. The probe arm configuration button is spring-loaded to the first button position. When the probe arm configuration button is in the first button position, the probe arm is locked to either the first use configuration or to the second use configuration. When the probe arm configuration button is in the second button position, the user may swing the probe arm from the first configuration to the second configuration, and vice versa.

In one embodiment, the probe arm configuration button is mounted on the body so as to be coaxial with the probe arm axis. A collar of the probe arm is disposed around the probe arm axis and has a plurality of slots. The probe arm configuration button is affixed to or formed with a button lock, which moves in concert with the probe arm configuration button. The button lock has a body and a plurality of angularly spaced apart flanges extending inwardly from the button lock body in parallel to the probe arm axis. When the button lock flanges are received in respective ones of the probe arm collar slots, the probe arm is locked to one of its use configurations. This happens when the probe arm configuration button assumes its first position. When the button lock flanges are axially displaced from the probe arm collar slots so that they are no longer inside the slots, the probe arm becomes free to rotate around the probe arm axis, from the first use configuration to the second use configuration and vice versa. This happens when the probe arm configuration button is in the second position.

In one embodiment, the slots of the probe arm collar include first and second slots and the flanges of the button lock include first and second flanges. When the first button lock flange is received in the first collar slot and the second button lock flange is received in the second collar slot, the probe arm is locked to the first use configuration. When the first button lock flange is received in the second collar slot and the second button lock flange is received in the first collar slot, the probe arm is locked in the second use configuration.

In one embodiment, the biasing of the configuration button is accomplished by a spring mounted on the probe arm axis. The spring acts as a compression spring to bias the probe arm configuration button to the first position. But the spring also acts as a torsion spring that biases the probe arm to the first use configuration. When the probe arm configuration button assumes the second position, and the probe arm has assumed the second use configuration, the spring will urge the probe arm to rotate around the probe arm axis to assume the first use configuration, which is more compact than the second use configuration.

According to another aspect of the invention, a thermometer has an elongate body with a first end and an opposed second end. An elongate probe arm is rotatably connected to the body around a probe arm axis that is spaced from the first end of the body. The probe arm has a length measured from its free end to the probe arm axis. A lamp is mounted in or on the front end of the body so as to illuminate a probe insertion target on the patient. A lamp switch button is disposed at a lamp switch button location on the surface of the body, so as to be disposed between the probe arm axis and the first end of the body. The probe arm is capable of assuming a plurality of use configurations including a first use configuration. In the first use configuration, a first portion of a sidewall of the probe arm is disposed to be proximate an outer surface of the lamp switch button. The lamp switch button turns the lamp on or off responsive to a user pressing the first portion of the prove arm sidewall against the outer surface of the lamp switch button.

In one embodiment, a channel is formed in the thermometer body so as to be parallel to a length axis of the body, and is sized to receive the probe arm when the probe arm is placed in the first use configuration. The lamp switch button is positioned in the bottom of the probe arm channel.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 4 is bottom left perspective view of the thermometer shown in FIGS. 1-3, but showing the probe arm in a second use configuration when the probe arm is at 180 degrees;

FIG. 5 is a top right perspective view of the thermometer in the second use configuration;

FIG. 7A is a perspective detail from a top right point of view of a configuration button used in the button assembly;

FIG. 9 is a side view of the button assembly;

FIG. 10 is a left perspective view of the button assembly with a sleeve omitted;

FIG. 11 is a perspective view of a button lock from a right side;

FIG. 12 is a perspective view from the left rear of the button lock showing a conductor passage;

FIG. 19 is a bottom front right perspective view of the probe assembly, the button assembly and the printed circuit board assembly, other parts of the thermometer being omitted for clarity, showing the routing of probe conductors;

FIG. 20 is a rear view of the button assembly and the probe collar in the first use configuration, showing the routing of probe conductors; and FIGS. 21A-21C constitute a logic diagram illustrating the operation of the thermometer.

DETAILED DESCRIPTION

Figure 1:
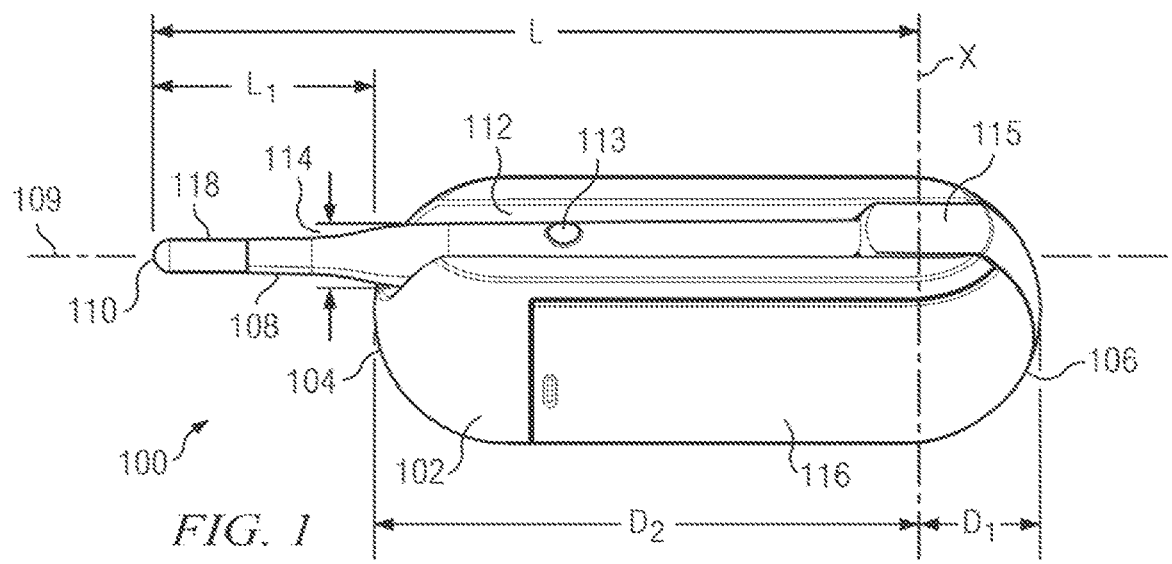
FIG. 1 is a perspective view of a multi-configuration thermometer in an assembled condition and taken from a bottom right point of view, a probe arm of the thermometer being shown in a first use configuration when the probe arm is at 0 degrees.

One embodiment of the invention is shown in FIG. 1. A thermometer 100 has an elongate body 102 with a front end 104 and an opposed rear end 106. Front end 104 and rear end 106 may be rounded, and the body in general may have a somewhat oval cross-sectional shape. A probe arm axis X, around which a probe arm 108 swings, is positioned much closer to the rear end 106 of body 102 than it is to front end 104. For example, a distance $D_1$ from the rear end 106 to axis X may be about 13-14 mm and a distance $D_2$ from the front end 104 to axis X may be about 66 mm. In the illustrated embodiment, axis X is orthogonal to a length axis A of the body 102 (seen in FIG. 2).

As shown in FIG. 1, A probe arm length L, as measured from axis X to its free end 110, is longer than distance $D_2$, and for example may be about 78 to 105 mm, and more preferably is about 92-93 mm. FIG. 1 shows the thermometer 100 in a first use configuration in which the thermometer 100 may be used as a rectal thermometer. In this configuration, most of the length L of the probe arm 108 occupies a probe arm channel 112 formed in the bottom of the thermometer body 102 to be parallel to axis A (FIG. 2) of the body. The channel 112 is open toward the bottom of body 102. The length of probe arm 108 that resides in channel 112 mostly has a cylindrical surface, but a target button 113 stands up from this generally cylindrical surface, where it may be felt by a user and used to actuate a lamp switch button that turns on and off lamp 214 (described below). The target button 113 faces downward. Near axis X, a lower surface 115 of a probe arm rear cover (later described) is formed to be planar and to be positioned about at the top of the opening of channel 112, so as to be continuous with the general bottom surface of body 102.

Figure 3:
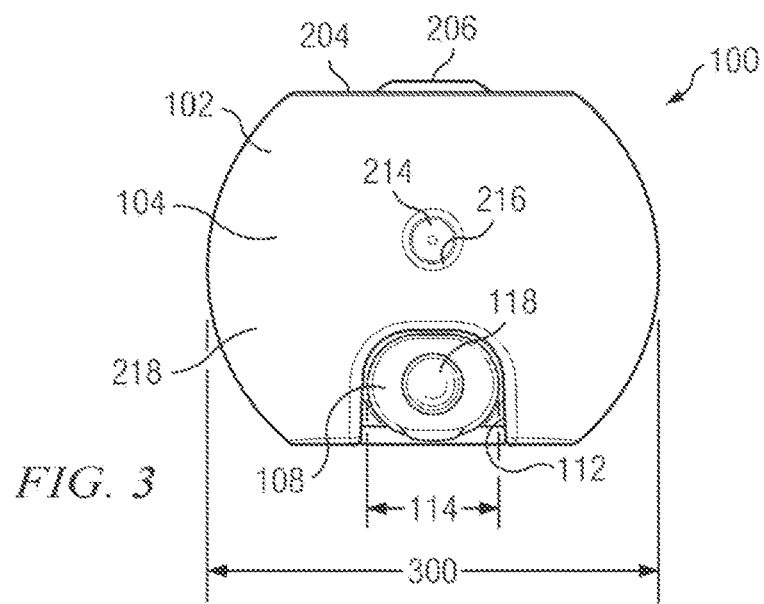
FIG. 3 is a front end view of the assembled thermometer in the first use configuration.

As can be seen, a diameter 114 of the probe arm 108, taken orthogonally to a probe arm length axis 109 (FIG. 1) and at the point where arm 108 extends beyond body front end 104, is much smaller than the largest general diameter 300 (FIG. 3) of the body 102. Front end 104 therefore acts as a stop or limit of the penetration of arm 108 into the infant's rectum. As seen in FIG. 1, in its first use configuration, the probe arm has an effective length $L_1$ that is much shorter than its total length L. Length $L_1$ may, for example, be in the range of about 12 to about 39 mm, and preferably is about 26 to 27 mm.

In the illustrated embodiment, a battery door 116 forms a portion of a continuous right side of the body 102. The battery door 116 is removed by the user to change out the battery for the device, described in more detail below. The free end 110 of arm 108 may be finished in a metal tip 118 to aid in heat conduction to a thermistor (not shown) housed therein.

Figure 2:
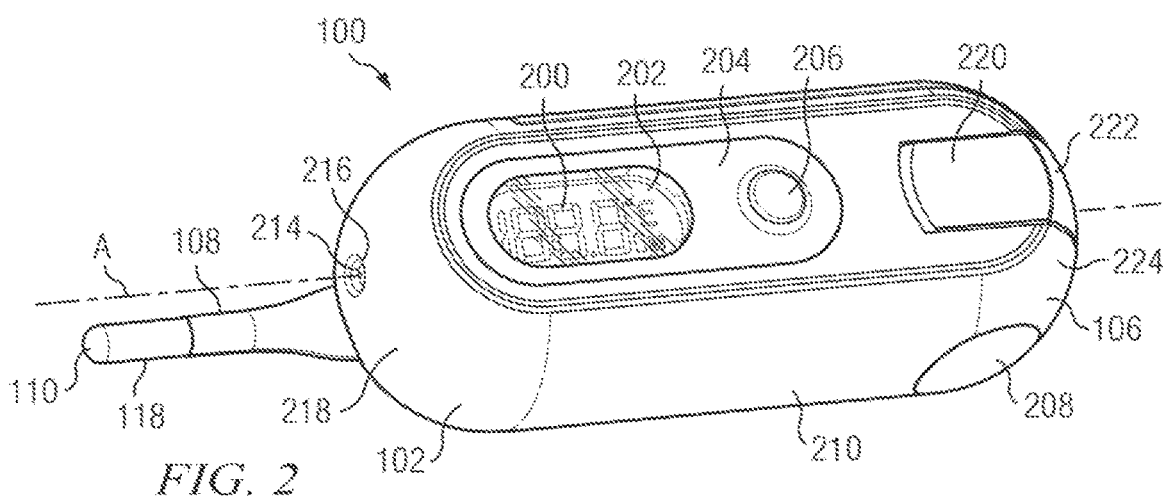
FIG. 2 is a perspective view of the assembled thermometer in the first use configuration, taken from a top left point of view.

As seen in FIG. 2, a multi-digit electronic display 200, which can be formed as an LED or liquid crystal display, appears in a window 202 formed in a top panel 204 of the body 102. The panel 204 is formed of a flexible material and is flat, with the exception of a membrane control button 206 that stands up from the more planar general surface. Control button 206 may be rearwardly spaced from the display window 202. A spring-loaded use configuration button 208 forms a portion of the left surface 210 of body 102. When not being pressed inwardly by a user, an outer surface 212 of the button 208 assumes a first position that preferably is flush with left body surface 210.

A lamp 214, which may be an LED, is mounted in the front end 104 of body 102 so as to emit light through a port 216 in the body front surface 218. Lamp 214 is turned on when the thermometer is being used in the first use configuration, and may optionally be used to illuminate a probe insertion target on the patient, particularly in low light conditions. A top surface 220 of a rear probe arm cover (later described) is substantially planar, and in the first use configuration resides in a plane close to and parallel to the plane of top panel 204. In this illustrated embodiment, a rear surface 222 of the rear probe arm cover is convex so as to be continuous with an outer surface 224 of the rear body end 106.

Turning now to FIGS. 4 and 5, The thermometer 100 is shown in a second use configuration suitable for measuring an infant's temperature within the mouth, in the axilla or under the armpit. Button 208 is pressed inward, the probe arm 108 is swung out of channel 112 and then button 208 is released to lock the probe arm 108 to a 180 degree position. An effective length $L_2$ of the probe arm 108 in this configuration is much greater than length $L_1$ and is equal to the difference between total probe arm length L and distance $D_1$. Length $L_2$ may, for example, be in the range of about 64 to about 92 mm, and more preferably is about 79-80 mm. The probe arm channel 112 is unoccupied when the thermometer is in the second use configuration. A lamp switch button 800 (FIG. 8) is located on the bottom of channel 112, between probe arm axis X and the body front end 104.

Figure 6:
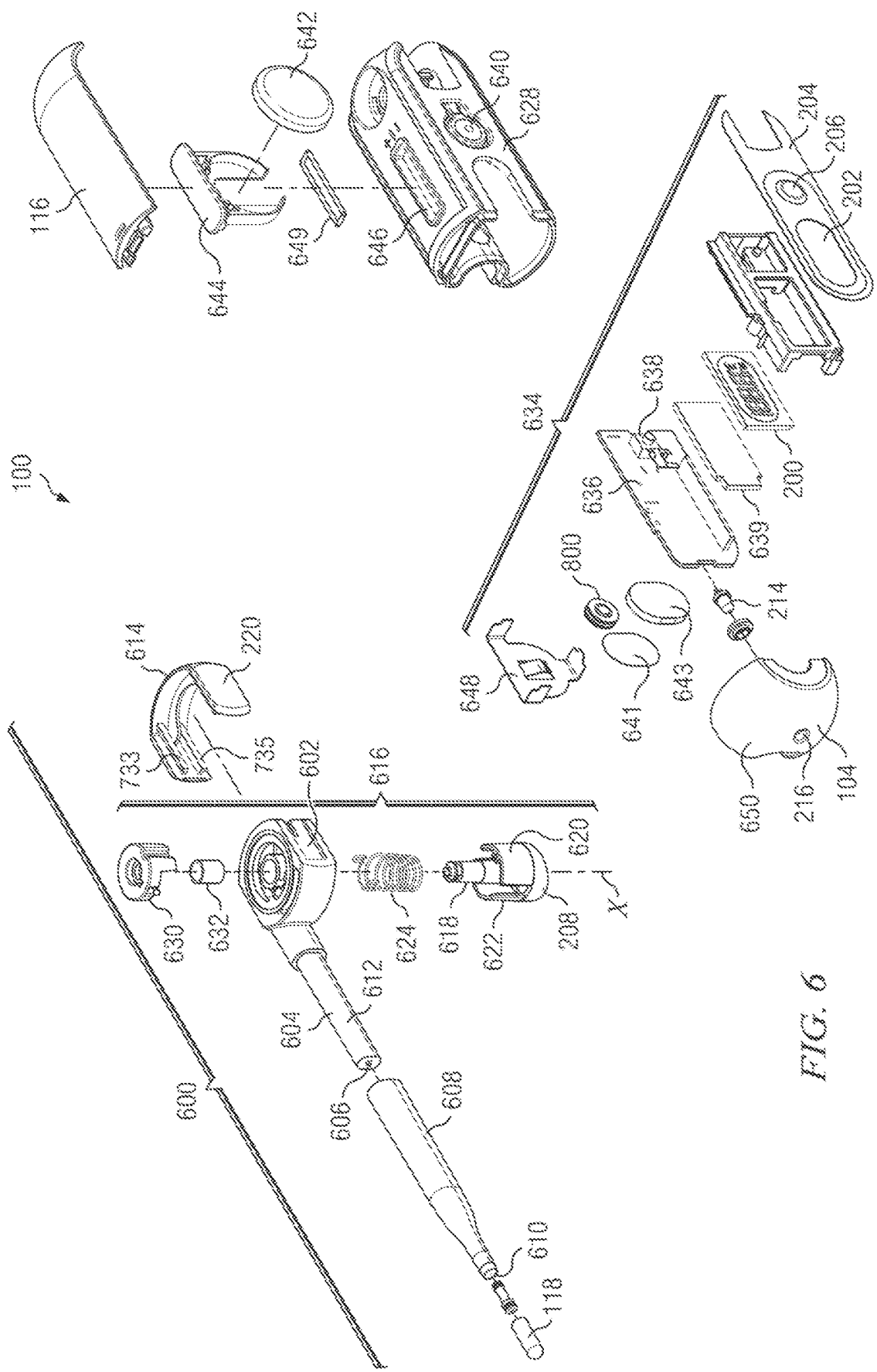
FIG. 6 is an exploded view of one embodiment of the thermometer.

As shown in the exploded view of FIG. 6, the thermometer 100 comprises several assemblies, each of which in turn has multiple parts. A probe arm assembly 600 includes a probe arm collar 602, which can be integrally molded with a first probe arm component 604 that forwardly extends from the collar 602. The probe arm collar 602 is disposed on arm axis X and, when unlocked, is free to swing around axis X. The first probe arm component 604 has a central bore or opening 606 through which are threaded conductive leads (described below) that in turn are connected to a thermistor (not shown) adjacent probe tip 118. A second, distal probe arm component 608 has a central bore 610 in communication with bore 606 and fits over an external sidewall 612 of the probe arm component 604. Probe arm component 608 therefore may be made of a material, such as an elastomer, that is different from that constituted by collar 602. The probe arm assembly 600 further includes a rear probe arm cover 614 that may be glued or snapped onto top and bottom receiving surfaces of collar 602.

The use configuration button 208 is a portion of a button assembly 616. While the parts of the button assembly 616 are generally arranged along axis X, they do not rotate around axis X. The configuration button 208 has a central shaft 618 that extends rightward (in this figure, upward) from the button 208's external surface. Button 208 further has a top flange 620 and a bottom flange 622, both of which are formed as cylindrical segments that are angularly spaced from each other and both of which are radially spaced from shaft 618.

A helical spring 624 is disposed mostly inside of button 208 between shaft 618 and flanges 620, 622. Spring 624 is under axial compression at all times and biases the button 208 in a leftward (in this figure, downward) direction, so that if not pressed will have an outer surface that is flush with the surface of body 102. The button 208 and the spring 624 extend rightwardly through a hole made in a body housing 628. The body housing 628 forms a structural frame to support and house the remaining components of thermometer 100. The button assembly 616 further includes a button lock 630 that is fixed to and moves axially with button 208 and an axial sleeve 632 that fits over shaft 618.

Thermometer 100 further includes a printed circuit board assembly 634, the components of which are housed in or on housing 628. A printed circuit board 636 has mounted thereon various components and integrated circuits, which will include a processor, volatile memory and nonvolatile memory. The integrated circuits further include a backlighting panel 639 that is positioned behind display 200, drivers (not shown) for display 200 and panel 639, and a control button microswitch 638 that is in contact with membrane button 206 through a resilient, hinged button tab 640 that is molded as a part of the housing 628. The integrated circuits further include components 641 and 643, which together form a speaker.

A battery 642 is used to power the thermometer 100. Battery 642 is housed within a removable battery tray 644 that in turn is accessed by removing the battery door 116. The battery 642 and the battery tray 644 are inserted through a battery slot 646 in the housing 628, where they are received between a metallic battery receiver 648 and one side of the printed circuit board 636. The slot 646 may be fitted with a gasket 649 at its external opening. The body housing 628 has affixed to it a convex front body cover 650 to make up the front end 104 of the body 102.

Figure 7:
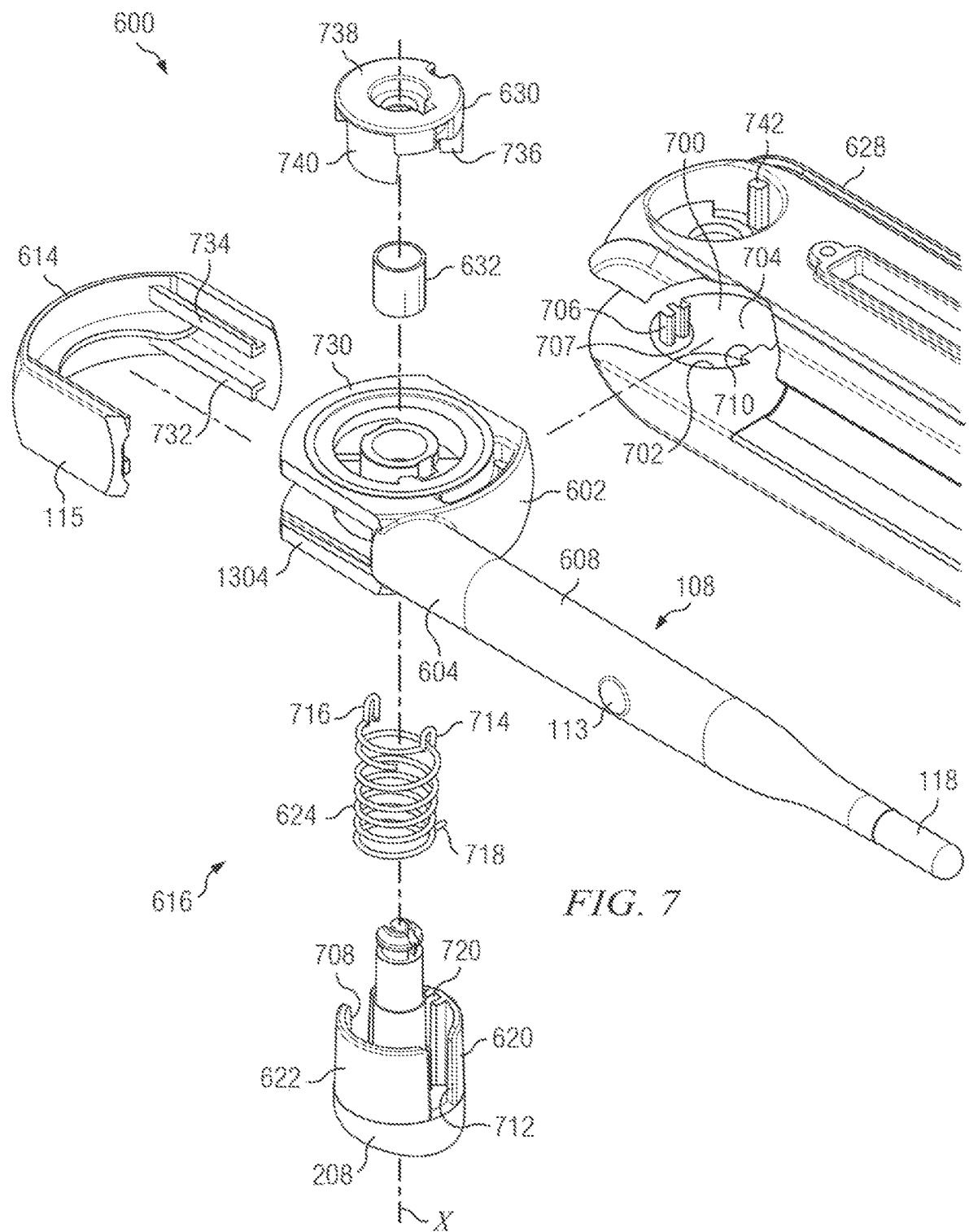
FIG. 7 is an exploded view of a configuration button assembly and a probe arm assembly.

The probe arm assembly 600 and the button assembly 616 are shown in more detail in the exploded view of FIG. 7. Housing 628 defines a roughly circular hole with an internal sidewall 700 facing axis X. Sidewall 700 comprises two arcuate slots or segments. An arcuate segment 702 of the internal sidewall 700 slidably receives the external surface of bottom flange 622 of button 208. An arcuate segment 704 of the internal sidewall 700 slidably receives the external surface of top flange 620 of button 208. A radially inwardly extending stop 706 of the internal sidewall 700 abuts an end 708 of the button flange 622. A similar stop 707 abuts an angular end (not shown) of flange 620. A radially inwardly extending stop 710 of the internal sidewall 700 abuts an opposite angular end 712 of the button flange 620. Stops 706, 710 constrain the movement of button 208 to be coaxial with axis X.

Figure 13:
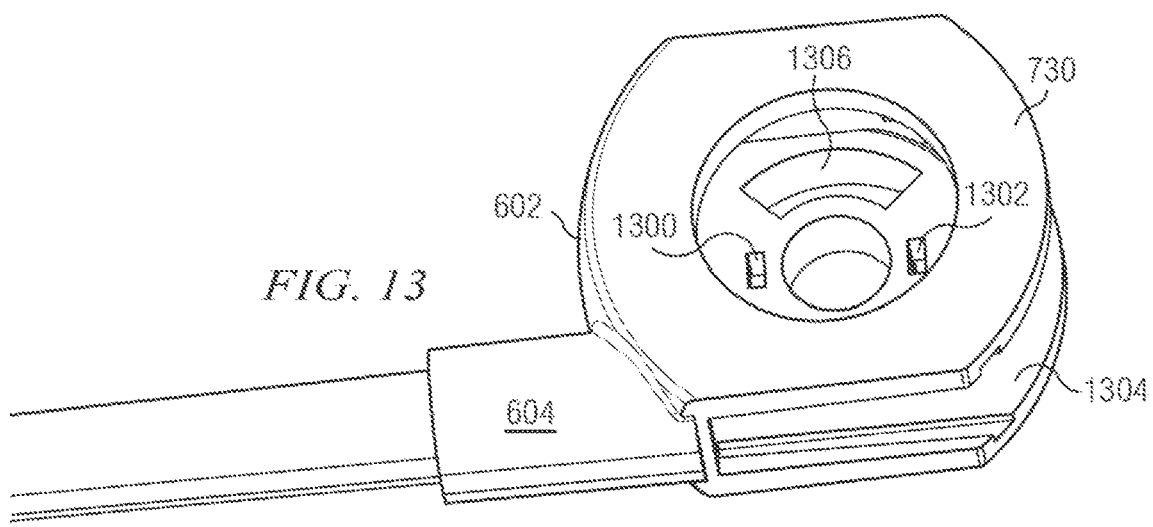
FIG. 13 is a perspective view of a probe arm collar component of the probe arm assembly from a right bottom point of view.

The rightward (in FIG. 7, upward) end of spring 624 terminates in ends 714 and 716 which rightwardly extend from the spring helix. Ends 714 and 716 are received in respective slots 1300 and 1302 of left plate 1304 of probe arm collar 602 (FIG. 13). Spring 624 further has a bent left end 718 that is received in a channel 720 formed by sidewalls that extend radially inwardly from button top flange 620 (FIG. 7). Since ends 714, 716, 718 are constrained from rotating around axis X, the spring 624 is capable of acting as a torsional spring as well as a compression spring. As assembled, the spring 624 will torsionally bias the probe arm 108 to the first use configuration, in which most of the probe arm 108 resides in probe channel 112, and which is more compact for storage. If the thermometer has been locked to the second use configuration, in which the probe arm 108 is at 180 degrees, pressing button 208 will unlock the probe arm and the spring 624 will then urge the probe arm back to zero degrees, to assume the first use configuration.

Button 208 is shown in more detail in FIG. 7A. The central shaft 618 is partially split to create a passage 722 for the thermistor conductor leads (not shown in this FIGURE). Passage 722 opens out onto the external surface of the shaft 618 in a forward direction. Near a right end 724 of the shaft 618 is formed a circumferential groove 726 to which the button lock 630 is fitted or snapped. As assembled, the button assembly sleeve 632 rides on a shaft shoulder 728, thereby containing the conductive leads (not shown) within the interior of shaft 618.

As shown in FIG. 7, the probe arm collar 602 includes a left plate 1304 and, spaced from it, a right plate 730. The rear probe arm cover 614 has interior rails 732 and 734 that fit to top margins of the left plate 1304 and the right plate 730. Similar rails 733 and 735 (FIG. 6) engage the bottom margins of the left plate and the right plate 730, enclosing the probe arm collar 602's contents to the top, bottom and rear.

The button lock 630 has a top flange 736 that leftwardly (inwardly) extends from a right end plate or button lock body 738, and a bottom flange 740 that also leftwardly (inwardly) extends from the right end plate 738. Top flange 736 and bottom flange 740 roughly are segments of a cylindrical sidewall and are angularly spaced apart from each other around axis X. The top and bottom flanges 736, 740 lock the probe arm 108 to either a 0 degree or a 180 degree position, in a manner described below.

Figure 8:
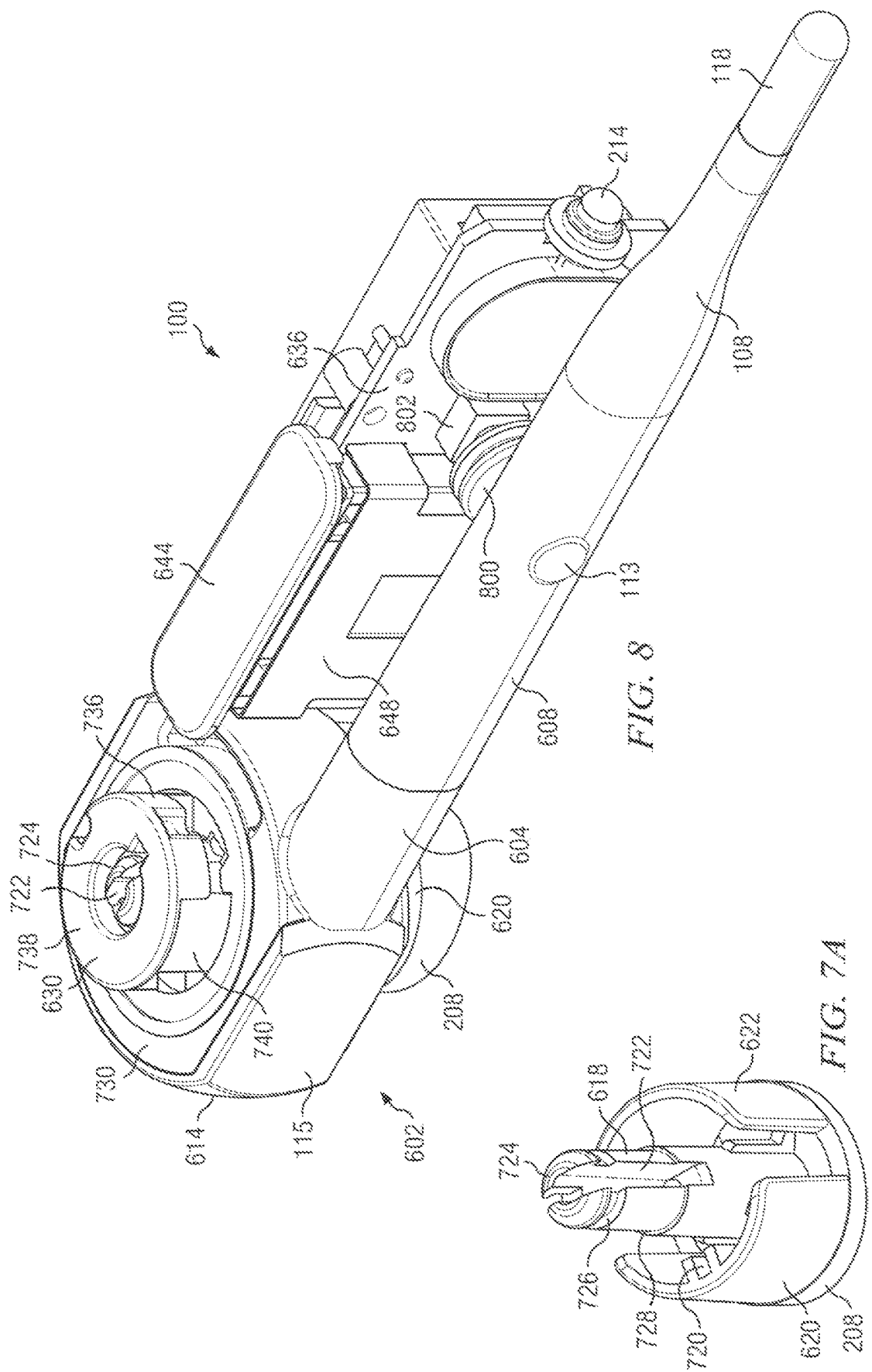
FIG. 8 is a view of the assembled thermometer in the first use configuration with certain parts omitted, to show the button assembly, probe arm assembly and a printed circuit board assembly.

FIG. 8 shows selected components of thermometer 100 in the first use configuration. In this configuration, a portion of the sidewall of the probe arm 108 opposite button target 113 comes into contact with a lamp switch button 800. The lamp switch button 800 is installed in a hole in the housing 628 so as to be on the surface of probe arm channel 112, at the bottom of the channel. The lamp switch button 800 in turn abuts a microswitch 802 that is mounted on the printed circuit board 636. When a user presses down on button target 113, the lateral probe arm component 608 will be displaced inwardly, contacting button 800 and in turn actuating microswitch 802. Clicking on the button target 113 when probe arm 108 is in channel 112 will cause microswitch 802 to turn lamp 214 on, and the next click will turn it off.

FIG. 9 is a side view of a disembodied button assembly 616. Button 208, sleeve 632 and button lock 630 move along axis X as a unit. The button lock 630 has a conductor port 900 through which the conductive leads (not shown in this FIGURE) are threaded. The conductive leads enter conductor port 900 from their attachment points (not shown) on printed circuit board 636 (FIG. 8). Depressing button 208 in a rightward direction will disengage button flanges 736 and 740 from arcuate slots in the right plate 730 of the probe arm collar 602 (FIG. 8). FIG. 10 is a view from a leftward direction of button assembly 616, without the sleeve 632. As button lock 630 moves right and left, a top-facing channel 1000 in button lock flange 735 slidably engages a radially inwardly extending tooth 742 (FIG. 7) in body housing 628, preventing rotation of the button lock 630. The right plate or body 738 of button lock 630 may be received on a shoulder 1002 of the central button shaft 618.

Further details of button lock 630 appear in FIGS. 11 and 12. A channel 1200 made in the right or outer plate 738 is parallel with axis X and communicates with conductor port 900. A leftward-extending sidewall 1202 of the button lock 630 has a channel 1204 formed in it that is parallel to axis X and is also in communication with conductor port 900. These channels 1200, 1204 ease the routing of the thermistor conductive leads (not shown in this FIGURE). A leftmost edge 1100 of flange 736 and a leftmost edge 1102 of flange 740 reside in the same plane, which is orthogonal to axis X.

Figure 14:
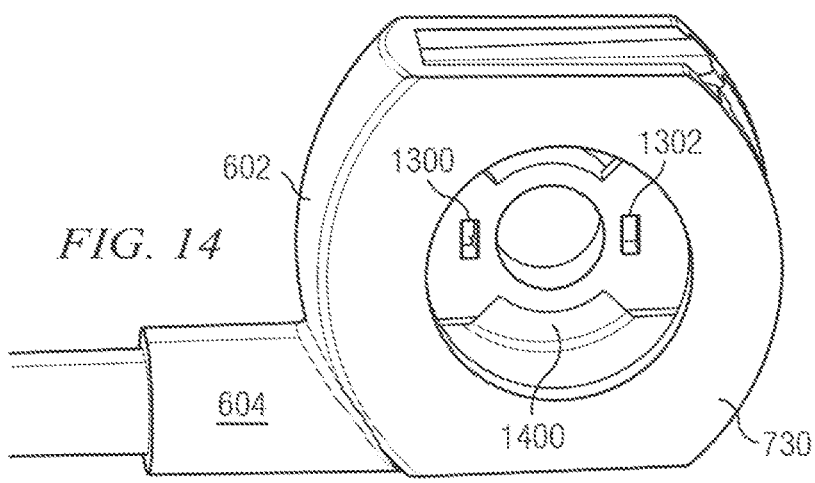
FIG. 14 is a perspective view of the probe arm collar from a right top point of view.

FIGS. 13 and 14 are views from slightly different perspectives of probe arm collar 602. In FIG. 13, a top arcuate slot 1306 is visible in left collar plate 1304. In FIG. 14, a bottom arcuate slot 1400, angularly spaced from slot 1306, is visible in the left collar plate 1304. In the first use configuration, the top arcuate slot 1306 will receive the top flange 736 of the button lock 630, and the bottom arcuate slot 1400 will receive the bottom flange 740 of button lock 630. But in the second use configuration, this arrangement is reversed: the top flange 736 of button lock 630 will be received in bottom arcuate slot 1400, while the bottom flange 740 of the button lock 630 will be received in top arcuate slot 1306. Therefore, each arcuate slot 1306, 1400 is dimensioned to receive either flange 736, 740. This arrangement creates two use configurations, in either of which the probe arm 108 is locked to the body 102: a first use configuration at zero degrees, and a second, opposite use configuration at 180 degrees.

Figure 15:
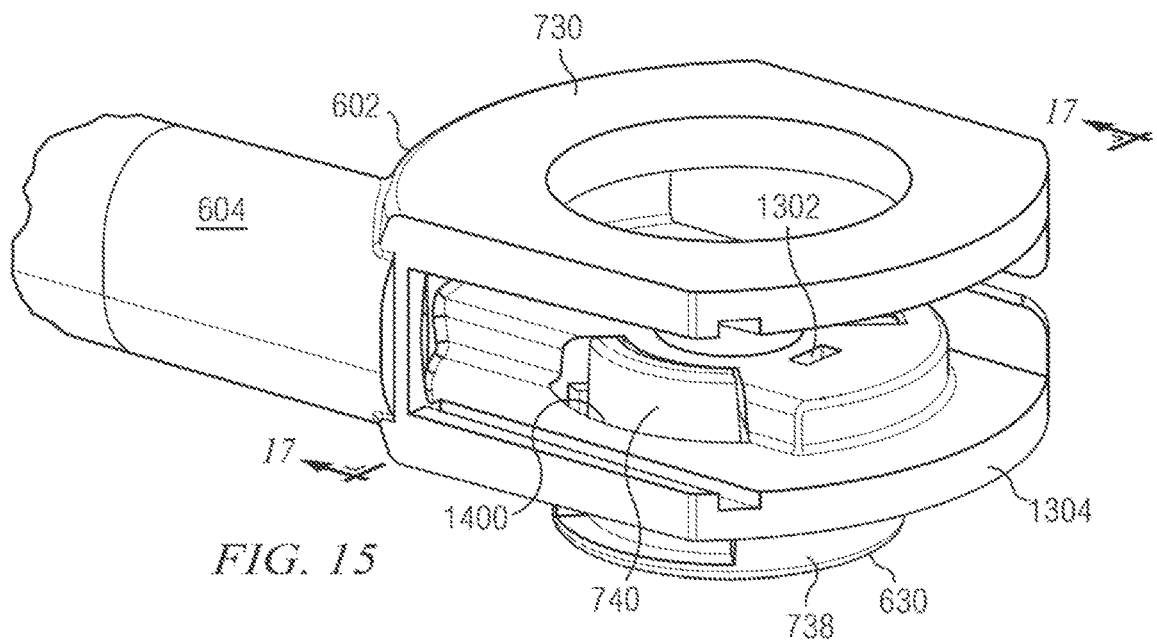
FIG. 15 is a bottom rear perspective view of the probe arm collar and a button lock component of the button assembly, shown in a locked, first configuration position.
Figure 16:
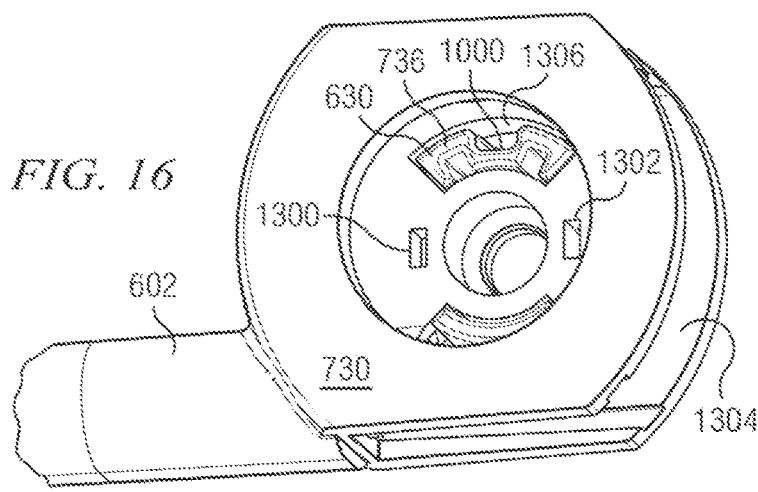
FIG. 16 is a further perspective view of the probe arm collar and button lock, shown in a locked, first configuration position.
Figure 17:
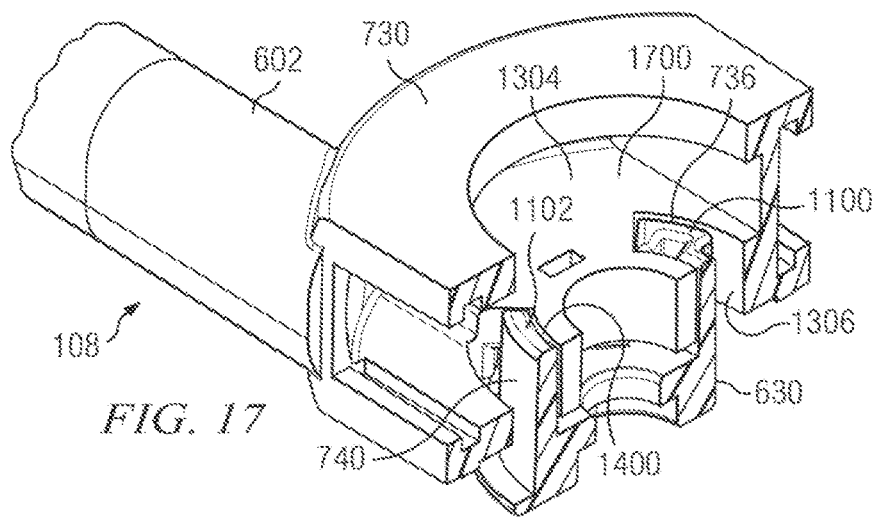
FIG. 17 is a sectional view taken along line 17-17 of FIG. 15.
Figure 18:
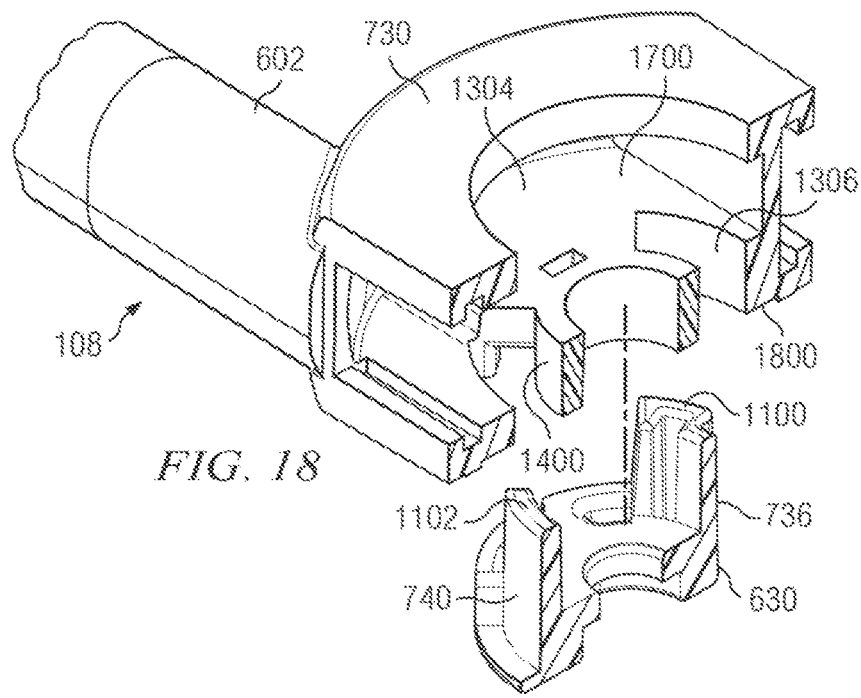
FIG. 18 is a sectional view similar to FIG. 17, but showing the button lock disengaged from the probe arm collar in an unlocked position.

The relationship of the probe arm collar 602 and the button lock 630 are shown in FIGS. 15-18. FIG. 15 shows button lock flange 740 received into bottom arcuate slot 1400, as would occur when the device is in the first use configuration. FIG. 16 shows that in the first use configuration, the top flange 736 of the button lock 630 is received in the top arcuate slot 1306. FIG. 17 is a sectional view of these components in the first use configuration. The leftmost edges 1100, 1102 of flanges 736, 740 are substantially coplanar with a right surface 1700 of the left plate 1304, such that an entire thickness of left plate 1304 is used to lock the probe arm 108 into place. But in FIG. 18, the button lock 630 has been displaced rightward (in this FIGURE, downward), such that the leftmost edges 1100, 1102 of the flanges 736, 740 are spaced in a rightward direction from a left surface 1800 of the left plate 1304. This happens when the user presses down (rightward) on button 208 against the compression bias of spring 624. In the condition shown in FIG. 18, the arm 108 is unlocked from the body and the user may swing it out from zero degrees. Leftmost edges 1100, 1102 will cam on surface 1800 until the flanges drop into arcuate slots 1400, 1306, locking the arm 108 to the second use configuration. If the arm 108 is already in the second use configuration, disengaging button lock flanges 736, 740 from slots 1400, 1306 will free the probe arm 108 to rotate back to the first configuration, under a torsion bias created by spring 624.

FIGS. 19 and 20 illustrate the routing of the conductive leads from the printed circuit board 636 to the thermistor (not shown) housed under metal tip 118. A two-lead conductor is schematically illustrated by a single line at 1900. While there may be two independent insulated wires or leads, these leads will be described as a single cable. From attachment points (not shown) on the PCB 636, conductor 1900 is routed rearwardly and radially inwardly until conductor 1900 reaches conductor port 900 in button lock 630. From there, it passes through channel 1200 on the inner side of button lock 630 and is then introduced into the right end of button shaft channel 722. Conductor 1900 is then threaded in a leftward direction until it clears right probe arm collar plate 730 (FIG. 20). From there, it is threaded in a forward direction down probe arm bore 606, eventually reaching tip 118. The only flexing of conductor 1900 will occur between shaft channel 722 and bore 606, as the probe arm 108 is moved from zero to 180 degrees and back.

Figure 21A:
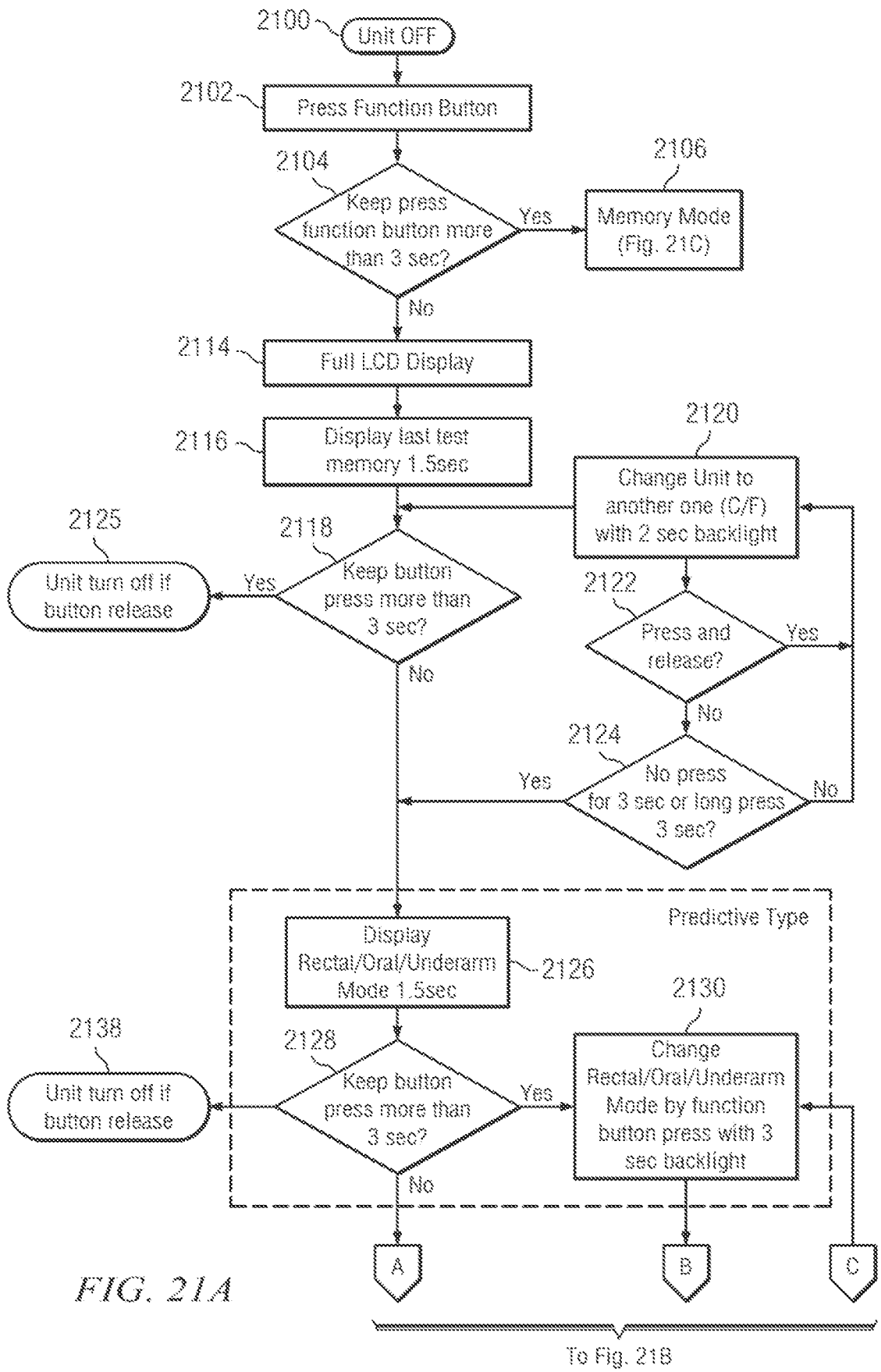

Apart from configuring thermometer 100 to either the first or second configuration and turning on or off the lamp 214, the device is operated through repeatedly pressing down and releasing the control button 206, which in turn actuates microswitch 638 on PCB 636. FIGS. 21A and 21B set forth a representative operational flow diagram. At an initial state (2100), the unit 100 is "off". The user presses the control button 206 at step 2102. If the user keeps the button depressed for more than 3 seconds (step 2104), the unit logic shifts operation to memory mode at step 2106 (see FIG. 21C). In memory mode, the user presses the button again at step 2108. If (step 2110) the button is pressed for less than three seconds, then at step 2112 the last stored temperature is displayed. Repeated pressings of the button at this step causes the unit to cycle through the last ten stored temperature readings. If at step 2110 the button is pressed for more than three seconds, the unit is returned to the OFF state (2100).

As seen in FIG. 21A, If at step 2104 the button is pressed for less than three seconds, the full LCD display is actuated at step 2114 and at step 2116 the last test memory is displayed. At step 2118, the unit senses whether the user has depressed the control button for more than three seconds. If so, and while the user continues to depress the control button, the unit enters a Celsius/Fahrenheit (C/F) selection mode at step 2120. At step 2120, the display 200 backlights for one second and shows "C" or "F", depending on which units the thermometer is now using. If the user wishes to change the measurement unit, the user presses and releases the control button at step 2122. If the user does nothing for three seconds, then at step 2124 the used units will stay the same. Releasing the button at step 2125, if it had been held down for more than three seconds, will return the unit to the OFF state at step 2100.

Thermometer 100 uses one of three predictive algorithms to increase the accuracy of the thermometer at ten-second and thirty-second readout points. The temperature is assessed at 10 seconds, and again at 30 seconds. The 10 second reading is to obtain a quick temperature read, while the 30 second reading is more accurate, as the thermistor will have more likely achieved equilibrium. The thermometer 100 may operate in an oral, underarm or rectal mode. The predictive algorithm for each temperature mode is different as there are different external factors that need to be taken into account. These factors include external noise factors associated with ambient air environments.

Mode selection is entered at step 2126. The display 200 will display one of "rct", "orl" or "und", here, for "rectal", "oral" or "underarm", respectively. The user may change modes at step 2128 by pressing the control button for more than three seconds. If the user does so, then at step 2130 the display 200 will be backlit for three seconds and will display the current mode. If at step 2132 the user presses and releases the control button, the unit switches mode and displays the new one back at step 2130. If the user either does not press and release the button, or keeps the control button pressed, then at step 2134 the program enters a temperature measurement mode at step 2136, in which the display initially displays "- - - ". This indicates that the unit is ready to measure temperature. Step 2136 is also reached from step 2128 by keeping the button pressed for less than three seconds. From step 2128, the unit turns off at step 2138 if the control button is pressed and released.

At this point the probe is inserted into the rectum, the oral cavity or under the arm, depending on the mode of operation selected. At step 2138, the unit queries whether the sensed temperature has reached 32.0 C. If it has, then at step 2140 the display 200 displays "[ ]". If it has not the process loops. The measurement process may be ended at this point by, at step 2142, the user pressing and releasing the button. The user may also arbitrarily end the temperature reading process this way at steps 2144 and 2146.

Reaching step 2140 turns on a ten second timer. If the user hasn't terminated the procedure at step 2144, then the logic asks whether 10 seconds has been reached at step 2148. If ten seconds have elapsed, then at step 2150 the thermometer 100 emits a short beep, the display 200 is backlit and displays the 10 second temperature. Then the backlight turns off. At 20 seconds, the ten second temperature is again displayed and the backlight flashes.

At step 2152, the logic tests whether 30 seconds has been reached. If it has not, then at step 2154 the ten second temperature continues to be displayed and the display keeps flashing. If the user presses and releases the control button at step 2146, the procedure aborts and the thermometer turns off. Otherwise, the program proceeds to step 2156. At step 2156, the thermometer emits three beeps, turns on the backlight and displays the 30-second temperature. This 30 second temperature is stored in a nonvolatile memory. If the 30 second temperature is not calculated during the current session, then the 10 second temperature is stored instead.

After the 30 second temperature is read by the user, at step 2158 the user may turn off the thermometer (step 2160) by pressing and releasing the control button. If the user does nothing for 10 minutes, then at step 2162 the unit will sense this inactivity and will turn off the thermometer anyway. The process ends at 2164.

In summary, an electronic thermometer has been described that operates in any of three user-selectable modes. A probe arm is locked to a first use configuration when the thermometer is used in a rectal mode, and this limits the depth of insertion of the probe. In the first use configuration, the probe arm may be used to switch on and off an illuminating lamp provided for dark conditions. The probe arm is locked to a second use configuration if the thermometer is to be used in an oral or an underarm mode.

While illustrated embodiments of the present invention have been described and illustrated in the appended drawings, the present invention is not limited thereto but only by the scope and spirit of the appended claims.

We claim:

1. A thermometer comprising:
   an elongate body having a first end and a second end separated from the first end, a battery fixably housed within the body;
   an elongate probe arm rotatably connected to the body around a probe arm axis, a temperature probe mounted on a free end of the probe arm, the temperature probe displaced from the probe arm axis by a probe arm length, the probe arm axis spaced from the first end of the body;
   the body having a surface, a lamp mounted on the surface of the body in the first end of the body and selectively operable to illuminate a probe insertion point of a patient, a lamp switch button operable to turn the lamp on and off, the lamp switch button having an outer surface, the lamp switch button mounted in the body at a lamp switch button location disposed between the probe arm axis and the first end of the body so that an outer surface of the lamp switch button outwardly extends from the surface of the body;
   the probe arm capable of assuming a plurality of use configurations in each of which the thermometer is configured to take a temperature of the patient, the use configurations including a first use configuration, a side wall of the probe arm having a first portion that is located proximate the lamp switch button location when the probe arm is in the first use configuration, the lamp switch button turning the lamp on or off responsive to a user pressing the first portion of the probe arm side wall against the outer surface of the lamp switch button.

2. The thermometer of claim 1, wherein the body has a length axis, the surface of the body having a channel formed in parallel to the length axis and sized to receive the probe arm when the probe arm is in the first use configuration, the channel having a bottom, the lamp switch button location disposed in the bottom of the channel.

3. The thermometer of claim 1, wherein the probe arm has a probe arm length axis, the side wall of the probe arm having a second portion disposed around the probe arm length axis to be opposed to the first portion of the side wall and to be remote from the lamp switch button, a target button mounted on the second portion of the side wall of the probe arm at a location aligned with the lamp switch button, such that pressure exerted by a finger of the user on the target button is transmitted to the first portion of the side wall of the probe arm and thence to the lamp switch button.

4. The thermometer of claim 1, further including an electronic display mounted on the surface of the body and a processor fixably mounted in the body to be coupled to the electronic display and the temperature probe.

5. The thermometer of claim 1, wherein the plurality of use configurations includes a second use configuration in which the probe arm is angularly displaced 180 degrees from the first use configuration, the probe arm locking to one of the first and second use configurations so that the probe arm will not rotate relative to the body when the thermometer is being used to take the temperature of the patient.

* * * * *